United States Patent [19]
Dowling et al.

[11] 3,890,563
[45] June 17, 1975

[54] MAGNETIC SUSCEPTIBILITY LOGGING APPARATUS FOR DISTINGUISHING FERROMAGNETIC MATERIALS

[75] Inventors: Donald J. Dowling; Kerry D. Savage, both of Houston, Tex.

[73] Assignee: Texaco Inc., New York, N.Y.

[22] Filed: Oct. 24, 1973

[21] Appl. No.: 409,203

[52] U.S. Cl. .............................. 324/6; 324/8
[51] Int. Cl. ....................... G01v 3/10; G01v 3/18
[58] Field of Search ............................ 324/5, 6, 8

[56] References Cited
UNITED STATES PATENTS

| | | | |
|---|---|---|---|
| 2,259,904 | 10/1941 | McNamee et al. | 324/8 |
| 2,401,280 | 5/1946 | Walstrom | 324/8 |
| 3,277,363 | 10/1966 | Schuster | 324/1 |
| 3,493,850 | 2/1970 | Schuster | 324/6 |
| 3,496,455 | 2/1970 | Gouilloud | 324/6 |
| 3,555,409 | 1/1971 | Atwood et al. | 324/6 |

*Primary Examiner*—Gerard R. Strecker
*Attorney, Agent, or Firm*—T. H. Whaley; C. G. Ries; Henry C. Dearborn

[57] ABSTRACT

Magnetic susceptibility bore hole logging method for distinguishing ferromagnetic materials from the paramagnetic materials. It involves logging the bore hole with and without a unidirectional magnetic field being applied to the formations being logged. The differences between these logs indicate ferromagnetic materials if the field strength is sufficient to cause saturation. Apparatus employs a permanent magnet or an electromagnet for creating the saturating field.

1 Claim, 8 Drawing Figures

PATENTED JUN 17 1975 3,890,563

SHEET 2

3,890,563

MAGNETIC SUSCEPTIBILITY LOGGING APPARATUS FOR DISTINGUISHING FERROMAGNETIC MATERIALS

BACKGROUND OF THE INVENTION

1. Field of the Invention

This invention concerns bore hole logging in general, and particularly relates to a logging method, or apparatus pertaining to susceptibility measurements. A special type of susceptibility logging provides for distinguishing formations having common magnetic characteristics.

2. Description of the Prior Art

Heretofore, it has been found that the results of magnetic susceptibility bore hole logging may be ambiguous with respect to certain formation materials. For example, paramagnetic materials have some common characteristics with ferromagnetic materials. Consequently, heretofore, a magnetic susceptibility log would not reveal which type of material was indicated.

Therefore, it is an object of this invention to teach a method and/or provide apparatus which can make a determination that distinguishes paramagnetic from ferromagnetic materials.

SUMMARY OF THE INVENTION

Briefly, the invention relates to bore hole logging of a type which includes magnetic susceptibility measurements of formations which are penetrated by the bore hole. It concerns a method for distinguishing ferromagnetic formations from paramagnetic formations. It comprises the steps of subjecting said formations to a biasing magnetic field, and measuring the magnetic susceptibility of said formation with and without said biasing magnetic field. It also comprises the step of comparing said measurements to determine when any difference exists, which difference indicates the presence of ferromagnetic formations.

Again, briefly, the invention concerns magnetic susceptibility bore hole logging and relates to the combination which comprises a logging tool with a transmitter coil on said tool for introducing an AC magnetic field into a surrounding medium. It also comprises a receiver coil on said tool which is spaced from said transmitter coil for developing a signal that is influenced by said surrounding medium. And it comprises unidirectional magnetic field generating means, mounted on said tool for applying a magnetic saturating field to said medium. Said last-named means comprises: a high-permeability core having a saturation coil wound thereon; a capacitor connected in circuit with said saturation coil for discharging therethrough; an electronic switch in circuit with said capacitor for controlling said discharge; and means including a delay circuit for gating said transmitter-coil energization off until transients from said capacitor discharge have been dissipated.

DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENTS

Figure 1:
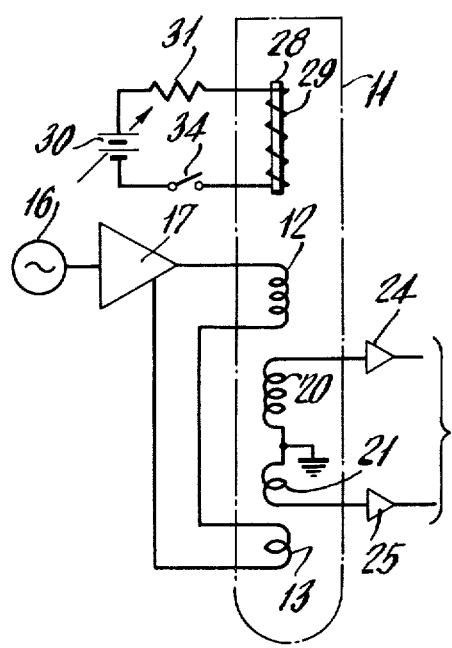
FIG. 1 is a schematic diagram illustrating the fundamental elements of apparatus for use with the invention.

In the past, it has been noted that magnetic susceptibility bore hole logging may create ambiguous results as to identification of the magnetic mineral which is causing a certain magnatic anomaly. This has been so for the reason that different magnetic materials can provide ambiguous indications because with certain mineral fractions ferromagnetic minerals and paramagnetic minerals will cause the same logging signal results. For example, a measurement of magnetic susceptibility indicating $100 \times 10^{-6}$ cgs units, could be caused by formations having either of two mineral fractions, i.e., (1) 33-⅓ percent siderite with 66-⅔ percent quartz, or (2) 0.033-⅓ percent magnetite with 99.966-⅔ percent quartz.

However, it has been discovered that if a unidirectional magnetic field of sufficient strength is applied to the formation, the ferromagnetic minerals will become saturated, while the paramagnetic minerals will not. Consequently, a log taken with, and another log taken without saturation, will reveal a different reading, and thus will indicate the presence of ferromagnetic minerals. Therefore, this invention will find application in avoiding the time-consuming and costly need for analysis of samples of bore hole cuttings, etc., in order to determine which type of minerals is present.

It is known that naturally-occurring ferromagnetic minerals include magnetite, ilmenite, ferrous ilmenite and pyrrhotite. Consequently, this invention enables a determination to be made from information readily obtained while it eliminates ambiguity where these ferromagnetic minerals are found in the same bore hole as paramagnetic minerals such as siderite.

One method of carrying out the invention is that of running a conventional magnetic susceptibility survey and, thereafter, passing a strong secondary magnetic field roughly ranging from 1,000 to 10,000 oersteds in intensity along the length of the bore hole being investigated. Then, repeating a susceptibility logging survey, which would reveal no change in the magnetic susceptibility measurements where paramagnetic materials are found, but there would be greater or lesser values recorded wherever ferromagnetic materials were located, depending upon the degree of saturation attained.

Another method of carrying out the invention is that of combining, in a logging sonde, a magnetic susceptibility measuring system to provide a "background" susceptibility survey and a magnetizing source for providing a strong secondary field that would be applied to the formations penetrated by the bore hole. Then, also, a second magnetic susceptibility measuring system would be employed to measure the formation susceptibility after having been subjected to the secondary field.

It will be appreciated that the magnetizing force could be supplied by a permanent magnet with its pole pieces oriented to cause maximum penetration into the bore hole walls. Similarly, it could consist of a number of permanent magnets located in a position so as to focus the field for maximum penetration. In addition (as will be indicated hereafter), different magnetic arrangements may be employed for applying a saturating field to the formation.

FIG. 1 illustrates the basic principles of the invention showing a schematic section of a logging sonde. Thus, there is a logging tool 11, indicated by a dashed-line outline. It has mounted thereon a pair of transmitter coils 12 and 13 which are energized from an AC source 16 via an amplifier 17. These coils produce an AC field in the bore hole surrounding tool 11 so that it penetrates the bore hole walls while developing output signals in a pair of receiver coils 20 and 21. The arrangement is schematically indicated, and these elements of a logging tool are conventional so that an explanation concerning the operation including the use of the nulling coils 13 and 21 is not necessary. Reference may be had to two patents which are assigned to the same assignee as this invention, i.e. U.S. Pat. Nos. 3,555,409 issued Jan. 12, 1971, and 3,715,655 issued Feb. 6, 1973.

It may be noted that there are a pair of amplifiers 24 and 25 which are connected to the receiver coils 20 and 21, respectively. However, these are merely employed in a conventional manner so as to provide matching for the logging cable, and to prevent loading and phase shifts in the receiver coils.

In order to generate a saturation field according to this invention, there is a core 28 with a winding 29 thereon. This winding is connected to a circuit including a battery 30 which is in series with a resistor 31. As indicated by an arrow across the battery 30, the potential of this DC source may be made variable. In addition, there is a switch 34 which controls the energization of the coil 29 and, consequently, the generation of a unidirectional magnetic field in the core 28. In practical application the switch 34 would be most likely controlled from the surface.

Figure 2:
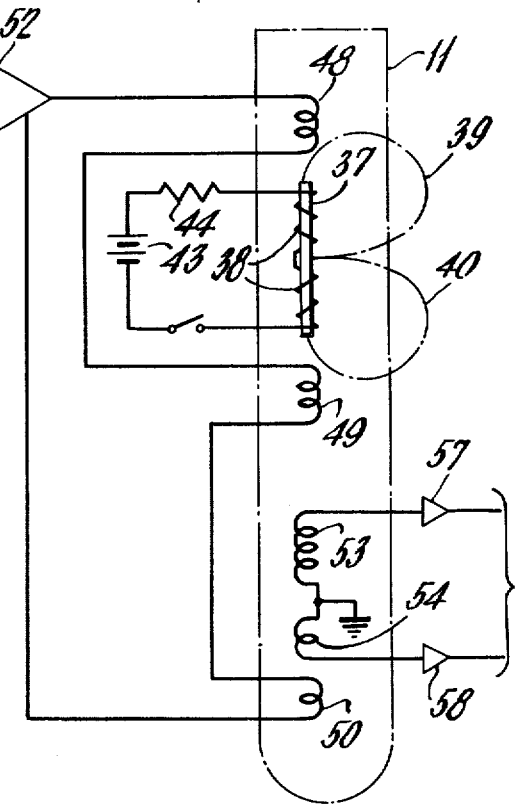
FIG. 2 is a similar schematic diagram illustrating one modification of apparatus in relation to a logging tool.

Referring now to FIG. 2, there is illustrated a modified relationship of elements in the system in order to reduce the influence of the magnetic saturating effect in the transmitter circuit. Thus, there is magnetic core 37 that has a bifilar winding, or coil 38 wound thereon. In effect, this creates two oppositely wound halves of the coil 38 which are wound in such a manner as to create a magnetic field in two parts. This is indicated by a dashed line 39 at the top half of the core 37, and another dashed line 40 at the bottom. The coil 38 is energized by a battery 43, and there is a resistor 44 connected in series therewith. Also, like FIG. 1, the energization of the winding 38 to apply a unidirectional magnetic field into the surrounding medium is controlled by a switch 45.

In this modification, there are a pair of transmitter coils 48 and 49, which are connected in series-aiding relationship. In addition, there is a conventional transmitter nulling coil 50. The transmitter coils 48 and 49 are located on opposite sides of the core 37 with its two halves of the coil 38. By having this arrangement, the saturation field coil 38 will not affect the AC field generated by the transmitter coils 48, 49 because the two halves of the winding 38 are in opposite directions. Consequently, the net induced signals will cancel. Therefore, the effect of coil 38 will be substantially like an infinite impedance which does not affect the susceptibility logging signals.

There is, of course, an amplifier 52 that is fed by an AC source 51. The amplifier 52 is connected with its output going to transmitter coils 48, 49 and 50 in a conventional manner. Also, conventional receiver coils 53 and 54, along with amplifiers 57 and 58, are spaced from the transmitter coils in the usual manner.

Figure 3:
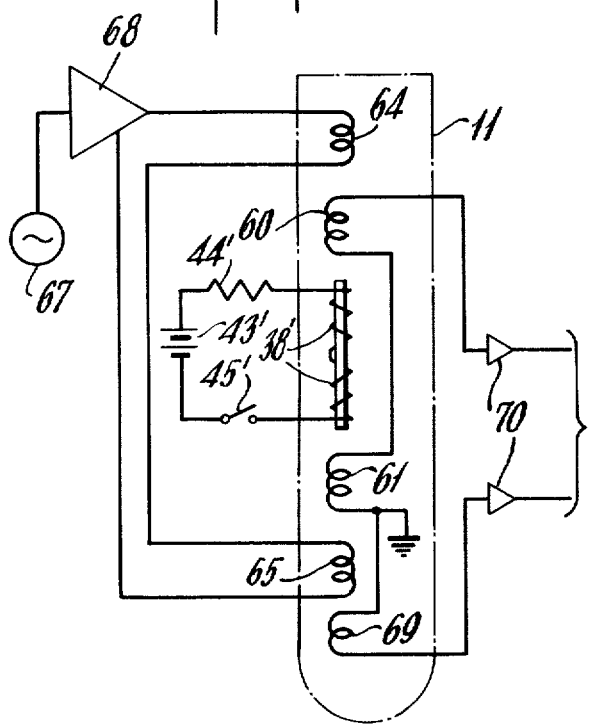
FIG. 3 is another schematic diagram like FIG. 2, but illustrating a different relative position for the receiver coil elements.

FIG. 3 illustrates a modified arrangement. The unidirectional saturation magnetic field generating elements are the same as those shown in FIG. 2 so that the same reference numbers with prime marks are employed in FIG. 3, and no further explanation is needed.

However, in this modification, the receiver coil (53 of FIG. 2) is divided into two separate coils 60 and 61. These are located with two halves of the saturating field coil 38' in between, so that the susceptibility sensing is done within that field.

The transmitter coils include a conventional pair like those shown in FIG. 1. Thus, there is a transmitter coil 64 connected in series with a transmitter nulling coil 65. These are fed by an AC source 67 via an amplifier 68. The receiver circuit includes a conventional nulling coil 69 and a pair of amplifiers 70.

Figure 4:
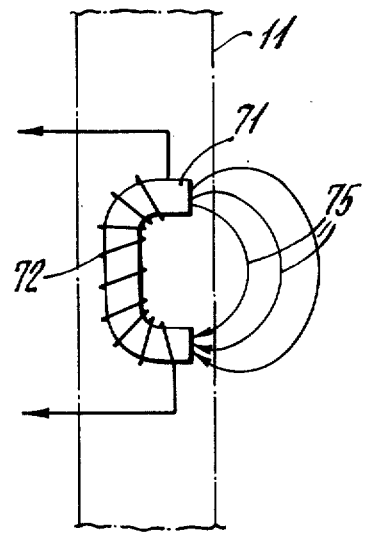
FIG. 4 is a schematic diagram illustrating one form of an electromagnet that may be employed to apply a saturating field.

FIG. 4 illustrates one type of structure that may be employed as the source of a unidirectional saturating field on a logging instrument according to this invention. Thus, there is a magnetic core 71 that has a coil 72 wound thereon. In this case, the core 71 is shaped in horseshoe style so as to concentrate and direct the magnetic field toward one side of the bore hole walls. It will be observed that this field is indicated by lines 75 representing magnetic lines of force. If this type of structure is employed, it may be desirable to provide the tool with off-centering structure (not shown) so as to help concentrate the magnetic field along one side of the bore hole.

Figure 5:
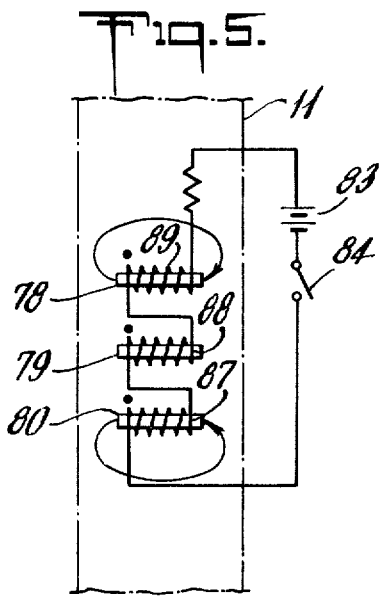
FIG. 5 is a schematic diagram similar to FIG. 4, but illustrating another modification of electromagnet structure that may be used in applying a saturating field.
Figure 6:
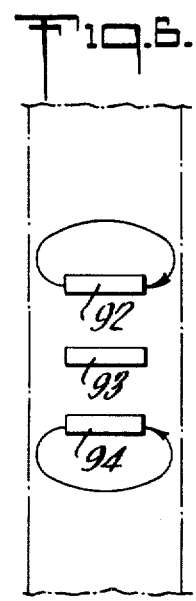
FIG. 6 is yet another schematic diagram similar to FIGS. 4 and 5. This figure illustrates the use of plural permanent magnets which may be used to create the saturating field.

FIGS. 5 and 6 each illustrate structure that may be employed for generating the saturating magnetic field. FIG. 5 indicates electromagnetic field generation, while FIG. 6 indicates the use of permanent magnet structure.

Thus, in FIG. 5, there are three individual magnetic cores 78, 79 and 80. These have a common electrical circuit applied thereto for causing current flow when desired from a DC battery 83 via a switch 84. Such current will flow through three individual coils 87, 88 and 89 that are connected in series. These windings are, of course, located on the individual cores 80, 79 and 78, respectively.

With reference to FIG. 6, it will be understood that a similar arrangement is indicated except that the magnetic field is generated by three permanent magnets 92, 93 and 94. The magnetic field created in such case is concentrated in substantially the same manner as in FIG. 5.

Figure 7:
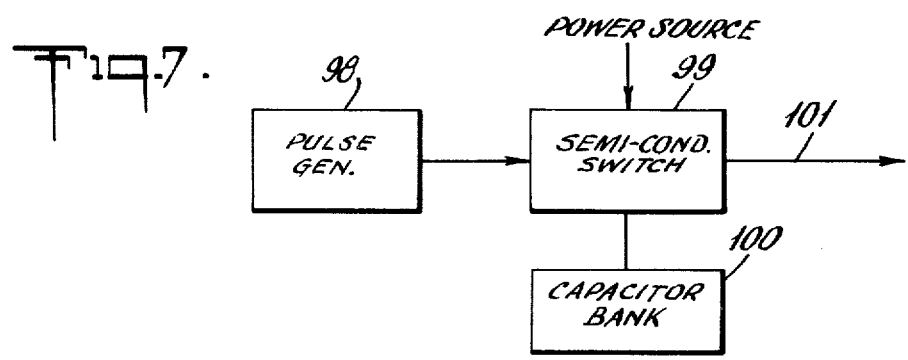
FIG. 7 is a block diagram illustrating elements of a pulsing arrangement for creating high-intensity pulsed field saturation.

FIG. 7 illustrates a procedure which may be employed in carrying out the invention. It employs high-intensity pulses of magnetic saturation in order to enable the peak power to be increased while reducing the demands on the power supply. Thus, there is a pulse generator 98 to control a power source (indicated by caption) via a single-pole double-through semiconductor switch 99. This controls the charging of a capacitor bank 100 and, thereafter, the discharging in order to produce high-current pulses over a connection 101 that would be applied to an electromagnetic coil for creating the desired pulsed field.

Figure 8:
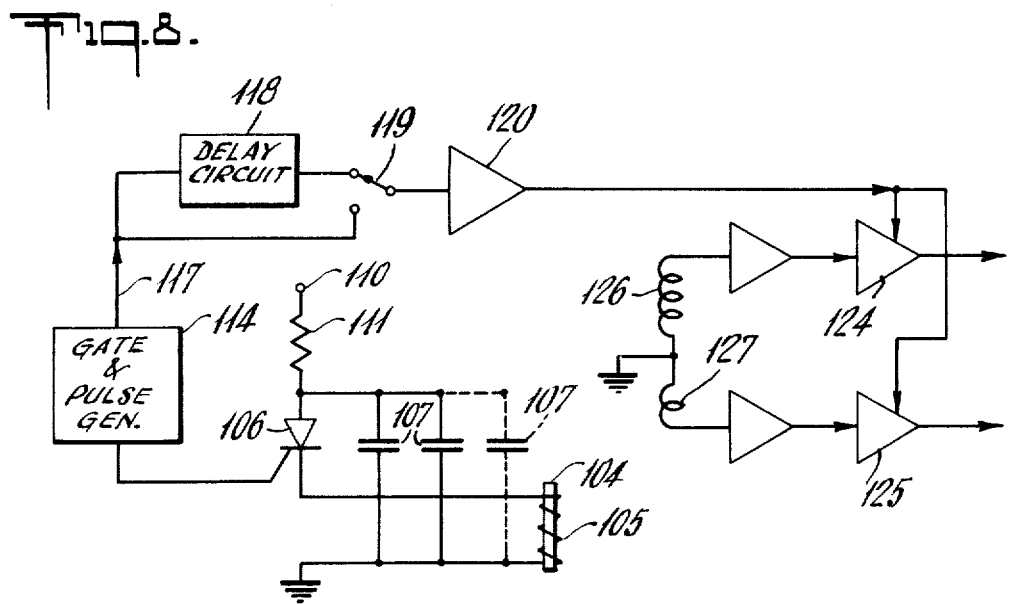
FIG. 8 is a schematic circuit diagram illustrating in more detail the elements employed in applying a pulsed saturating field as indicated by the FIG. 7 diagram, to a logging tool circuit.

FIG. 8 illustrates schematically an arrangement of elements for carrying out the pulsing indicated by the description relating to FIG. 7. There is a magnetic core 104 with a coil 105 wound thereon. Coil 105 is connected in series with a silicon-controlled rectifier 106. A plurality of capacitors 107 are connected across the combined silicon-controlled rectifier 106 and the coil 105 in series so that they may be charged from a source of potential that would be connected to a terminal 110. The charging would take place by current flow via a resistor 111 so long as the rectifier 106 is not conducting. The control electrode of silicon-controlled rectifier 106 is connected to a combination gate and pulse generator 114 which will provide signals to trip the rectifier 106 at desired times in order to discharge the capacitor bank 107 through the coil 105. Such discharge will generate a magnetic field in the core 104 and create the pulsed-saturating-field effect that is to be employed with a logging procedure according to this invention.

It is to be noted that there is an additional circuit arrangement in order to avoid interference in the search, i.e., receiver coil which would be caused by transients that are created when the pulsed field is generated. Such arrangement includes a circuit connection 117 from the gate and pulse generator 114. This connection 117 leads to a delay circuit 118 which is connected via a switch 119 to an amplifier 120. The output of amplifier 120 is connected to a pair of gates 124 and 125 that act to block the signals from a receiver coil 126 and its nulling coil 127. Such blocking action occurs during the short time when each magnetic saturation pulse is being applied.

While particular embodiments of the invention have been described above in considerable detail and in accordance with the applicable statutes, this is not in any way to be taken as limiting the invention but merely as being descriptive thereof.

We claim:
1. In magnetic susceptibility bore hole logging, the combination comprising
   a logging tool,
   a transmitter coil on said tool for introducing an AC magnetic field into a surrounding medium,
   a receiver coil on said tool and spaced from said transmitter coil for developing a signal that is influenced by said surrounding medium,
   unidirectional magnetic-field-generating means mounted on said tool for applying a magnetic saturaring field to said medium,
   said last-named means comprising a high-permeability core having a saturation coil wound thereon,
   a capacitor connected in circuit with said saturation coil for discharging therethrough,
   an electronic switch in circuit with said capacitor for controlling said discharge, and
   means including a delay circuit for gating said transmitter coil energization off until transients from said transmitter discharge have been dissipated.

* * * * *